US009296953B2

(12) United States Patent
Newman et al.

(10) Patent No.: US 9,296,953 B2
(45) Date of Patent: Mar. 29, 2016

(54) APPARATUS AND METHODS FOR REMOVING HYDROCARBONS AND OTHER ADHERENTS FROM SAND

(75) Inventors: Paul Newman, Dartmouth (CA); Mazen Markabi, Bedford (CA)

(73) Assignee: M-I DRILLING FLUIDS CANADA, INC., Calgary, Alberta (CA)

( * ) Notice: Subject to any disclaimer, the term of this patent is extended or adjusted under 35 U.S.C. 154(b) by 554 days.

(21) Appl. No.: 13/809,310

(22) PCT Filed: Jul. 8, 2011

(86) PCT No.: PCT/CA2011/000793
§ 371 (c)(1),
(2), (4) Date: Apr. 23, 2013

(87) PCT Pub. No.: WO2012/003582
PCT Pub. Date: Jan. 12, 2012

(65) Prior Publication Data
US 2013/0220891 A1  Aug. 29, 2013

Related U.S. Application Data

(60) Provisional application No. 61/363,021, filed on Jul. 9, 2010.

(51) Int. Cl.
*C10G 1/04* (2006.01)
*B01D 21/00* (2006.01)
(Continued)

(52) U.S. Cl.
CPC ............ *C10G 1/045* (2013.01); *B01D 21/0045* (2013.01); *B01D 21/0084* (2013.01);
(Continued)

(58) Field of Classification Search
CPC ............ C10G 1/00; C10G 1/04; C10G 1/042; C10G 1/045; C10G 1/047
See application file for complete search history.

(56) References Cited

U.S. PATENT DOCUMENTS 2,453,060 A  11/1944  Bauer et al.
5,762,780 A   6/1998  Rendall et al.
2007/0205141 A1*  9/2007  Freeman et al. ............. 208/390

FOREIGN PATENT DOCUMENTS

CA  2580098 A1  6/2009

OTHER PUBLICATIONS

International Search Report for PCT Application Serial No. PCT/CA2011/000793 dated Sep. 7, 2011.

*Primary Examiner* — Brian McCaig

(57) ABSTRACT

A system for removing hydrocarbons and other contaminants from sand and/or drill cuttings includes screening large debris from a first loading inlet hopper (101) to a screen covered receiving hopper (102) that may contain a chopper and chemical additive nozzles (105). A first inclined auger (104) receives the material from hopper (102) at its lower inlet port and conveys the material upwards dropping it into a hopper (106) and then to a unit (107) either of which may include a crasher (106). Unit (107) includes an eductor (109) which feeds the screened and treated sand slurry to desanding units (112) such as hydro cyclones. The underflow from the desanders is sent to an auger tank's (114) first compartment (113) while the overflow is sent to its second compartment (115) where a flow distributing conduit (117) that disperses it over the surface of both compartments (113), (115). The auger tank (114) employs horizontal augers (116) that are arterial both the first and second compartments (113) and (114). Second compartment (115) contains inclined plate separators (118) and sparging tubes (119). Overflow from auger tank (114) is sent to another two compartment separator (120). The first compartment (121) which receives the overflow from auger tank (114) includes a weir-type partition topped by an oil skimmer (123) connected to a voiding pump (125) feeding an oil tank (124) and defining a horizontal gap with the two compartment separator tank bottom as at (121). Clean water passing through the bottom weir is allowed to spill over the top of the an uppermost weir in the two compartment separator tank (120) into clean water collection tank (122) from when it is recycled to other components of the system. The undertow recovered from the auger separation tank (114) may be further decontaminated by sending it via an inclined conveyor to a serial connection with a second system similar to the one described herein above.

19 Claims, 2 Drawing Sheets

(51) Int. Cl.
*B01D 21/24* (2006.01)
*B03B 9/02* (2006.01)
*B03D 1/10* (2006.01)
*C10G 1/00* (2006.01)
*B01D 21/26* (2006.01)

(52) U.S. Cl.
CPC .............. *B01D21/2461* (2013.01); *B03B 9/02* (2013.01); *B03D 1/10* (2013.01); *C10G 1/04* (2013.01); *B01D 21/262* (2013.01); *B01D 2221/04* (2013.01)

APPARATUS AND METHODS FOR REMOVING HYDROCARBONS AND OTHER ADHERENTS FROM SAND

BACKGROUND

1. Field of the Invention

Embodiments disclosed herein relate to apparatuses and methods for removing hydrocarbons from sand. More specifically, embodiments disclosed herein relate to apparatuses and methods for removing hydrocarbons from sand using a multiple stage solvent and surfactant decontamination process. More specifically still, embodiments disclosed herein relate to apparatuses and methods for removing hydrocarbons deposited in sand through drilling or production operations.

2. Background Art

When drilling oil and/or gas wells, as well as producing hydrocarbons, accidents may occur, such as leaking oil wells, leaking pipes, and oil spills that result in sand or other fine particulate matter (e.g., silt) being contaminated. Because leaked or spilt oil may be mixed with water, dispersants, and other contaminants, the spilt oil may act more like grease. Thus, traditional methods for extracting oil from sand, as occurs in removing oil from tar sands, may not work effectively for leaked or spilt oil.

Traditional methods for removing hydrocarbons from sand relied on the use of chemicals that allowed for the recovery of the hydrocarbons but not the cleaning of the contaminated sands, as required in order to reintroduce the sand into the natural environment. Such traditional units were also typically not meant for easy transport and assembly in response to an emergency, as may occur in the case of an oil spill.

Accordingly, there exists a need for apparatuses and methods for removing hydrocarbons from sand in a more efficient and effective manner.

SUMMARY OF THE DISCLOSURE

In one aspect, embodiments disclosed herein relate to a system for removing hydrocarbons from sand, the system including a first hopper configured to screen large debris from a contaminated sand source, a first inclined auger in fluid communication with the first hopper, a second hopper in fluid communication with the first inclined auger, the second hopper comprising a eductor, and a first desanding unit in fluid communication with the second hopper. The system further includes a first auger tank having a first compartment and a second compartment and a horizontal auger, wherein the first compartment is configured to receive an under flow from the first desanding unit and the second compartment is configured to receive an overflow from the first desanding unit, a second inclined auger in fluid communication with the horizontal auger, and a separator in fluid communication with the first auger tank and configured to receive a hydrocarbon overflow from the first auger tank.

In another embodiment disclosed may relate to, a method of removing hydrocarbons from sand, the method including supplying contaminated sand, removing large debris from the contaminated sand, injecting a fluid into the contaminated sand to create a sand/fluid mixture, and separating hydrocarbons and the fluid from the mixture, wherein the hydrocarbons and fluid are transferred to an auger tank as an overflow and the sand is transferred to the auger tank as an underflow. The method further includes settling the sand in the auger tank into a horizontal auger, transferring the sand to an inclined auger, separating hydrocarbons from the fluid in the auger tank, transferring the hydrocarbons to a separator, and separating the hydrocarbons from the fluid in the separator.

Other aspects and advantages of the invention will be apparent from the following description and the appended claims.

DETAILED DESCRIPTION

In one aspect, embodiments disclosed herein relate generally to apparatuses and methods for removing hydrocarbons from sand. More specifically, embodiments disclosed herein relate to apparatuses and methods for removing hydrocarbons from sand using a multiple stage solvent and surfactant decontamination process. More specifically still, embodiments disclosed herein relate to apparatuses and methods for removing hydrocarbons deposited in sand through drilling or production operations.

Embodiments of the present disclosure use two distinct wash phases, a primary solvent wash and a secondary demulsification/surfactant wash to separate hydrocarbons from contaminated sand. The primary wash removes the majority of the hydrocarbons, while the secondary wash is a polishing wash to remove residual hydrocarbons from the surface of the sand. Contaminated sands, in addition to having hydrocarbons, may also be contaminated with other contaminants, such as dispersants, as well as either fresh or sea water.

Figure 1:
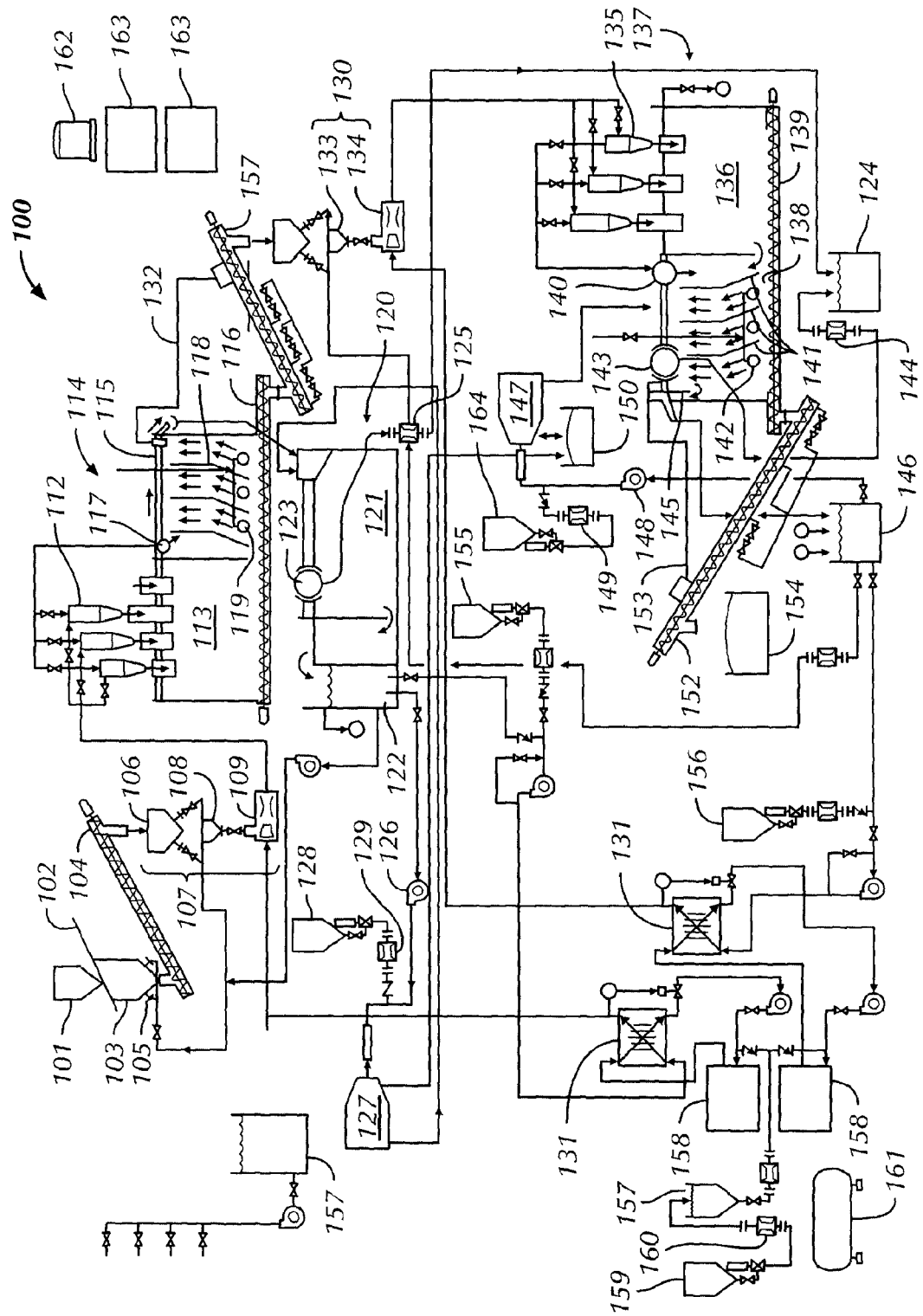
FIG. 1 is a schematic overview of a system for removing hydrocarbons from sand according to embodiments of the present disclosure.

Referring initially to FIG. 1, a schematic of a system for removing hydrocarbons from sand in accordance with embodiments of the present disclosure is shown. In this embodiment, system 100 includes a sand inlet 101 that is configured to receive contaminated sand from a loader, excavator, or other transportation means for moving contaminated sand. The sand inlet 101 is connected to a screening hopper 102 that is configured to remove large debris (e.g., seaweed, driftwood, rocks, etc.) from the contaminated sand. In one aspect, screening hopper 102 may include a vibratory table (not shown) to assist in removing the debris. The vibratory table may include a screen (not shown), such as a half-inch screen having two inch perforations, thereby allowing the contaminated sand to fall through the screen while retained the large debris. In certain embodiments, the screen of screening hopper 102 may also be set at a particular angle, such as 17 degrees, thereby promoting the removal of the large debris from the sand. Those of ordinary skill in the art will appreciate that the size of the perforations in the screen, as well as the angle the screen is set in screening hopper 102 may be adjusted based on the requirements of the operation, the volume of sand being processed, and/or the size of the sand.

The contaminated sand may then pass through the screen of the screening hopper 102 and fall into a chopper screw conveyer 103 that transports the sand to an incline auger 104. The chopper screw conveyer 103 and/or the screen hopper 102 may include injection ports 105 that are configured to receive a chemical additive, such as a solvent. The chemical additive may be added prior to injection into the chopper screw conveyer 103, thereby allowing the chemical to mix with the contaminated sand and assist in an initial separation of the hydrocarbons from the sand. In certain embodiments, the chemical additive may be added in a liquid form that has been mixed with either fresh or sea water prior to injection. Chopper screw conveyer 103 is configured to crush the contaminated sand and promote the separation of the hydrocarbons from the sand. Chopper screen conveyer 103 may also disperse the chemical additive, if added, more evenly throughout the contaminated sand. In certain aspects, a water or brine solution may also be added without chemical additives, thereby resulting in a slurry-type mixture.

Figure 2A:
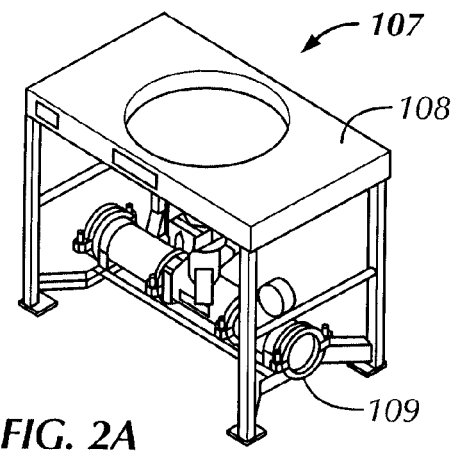
FIGS. 2A-C are perspective, side, and end views of a hopper according to embodiments of the present disclosure.
Figure 2B:
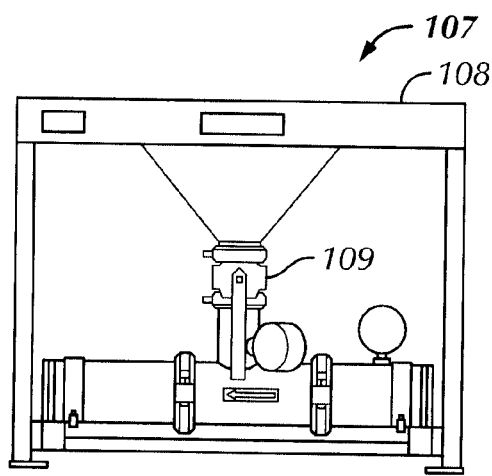
Figure 2C:
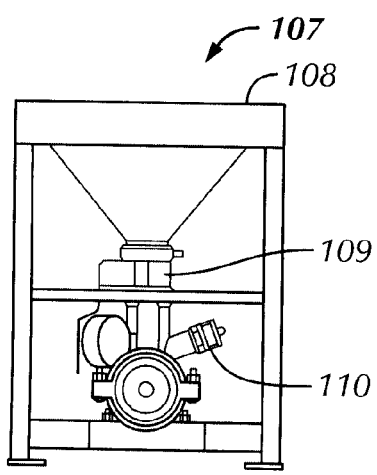

Chopper screw conveyer 103 then transfers the material horizontally to incline auger 104 that may further break up contaminated sand that may be compacted or clumped together. In certain embodiments, the chopper screw conveyer 103 may not be necessary, as a crusher 106 may located downstream of the incline auger 104. In such an embodiment, the compacted and clumped sand may be broken apart by the crusher 106. The incline auger 104 feeds the contaminated sand into a second hopper 107, or into crusher 106 and subsequently into second hopper 107. In certain embodiments, second hopper 107 may include a high-speed, rapid-induction, dynamic eductor hopper, such as the HIRIDE Hopper commercially available from M-I Swaco, L.L.C, in Houston, Tex. Referring briefly to FIGS. 2A-C, perspective, side and end views, respectively, of second hopper 107 according to embodiments of the present disclosure is shown. The second hopper 107 includes a table 108 and a dynamic eductor 109. As the sand flows from the table 108 into the eductor 109, the sand enters a conduit that has a minimum pressure drop nozzle. The flow exits the downstream side of the nozzle at a high velocity thereby creating a zone of relative low pressure, which vacuums the sand into a void space downstream of the nozzle. The sand is then drawn through the opening of a diffuser, where the diffuser promotes turbulence and mixing of the sand with any liquids and/or chemical additives that may have been added to the sand. The chemicals may have been added earlier in the process or while the sand was entering the chopper screw conveyer 103 or the crusher 106. In certain embodiments, liquids and chemical additives may be added to the sand through injection ports 110 on eductor 109.

After the sand exits a first portion of the diffuser, the sand is drawn into a second portion of the diffuser, which again changes the velocity of the flow, creates additional turbulence, and recirculation zones. The flow then enters a second throat of the diffuser and exits through a conduit, which also changes the velocity of the flow and creates additional turbulence and recirculation. As the flow of sand and fluids exits eductor 109, all material including the chemical additives are mixed and effectively entrained in the mixture. Due to the design of the eductor 109, second hopper 107 provides a shear source that may provide a shear rate of about 6000 reciprocal seconds at a flow rate of about 800 gallons per minute (gpm). The second hopper 107 design also provides a vacuum to draw the sand into eductor 109 and promotes mixing of the sand, liquids, and chemical additives as the flow exits second hopper 107. The additional shear and mixing may thereby increase the dispersion of the chemicals throughout the sand and liquid, enhancing separation, and allowing for additional downstream separation to proceed more efficiently and/or with greater ease.

Depending on the requirements of the operation, the flow rate of the sand/fluid mixture may be adjusted to further enhance separation of the hydrocarbons from the sand. In certain embodiments, the flow of the sand through the system may be regulated by a pump (not shown), so that the flow may be adjusted between, for example 800 and 1000 gpm. Referring back to FIG. 1, as the sand exits second hopper 107, the sand is transferred to one or more desanding units 112. In certain embodiments, the transportation of the sand from second hopper 107 to desanding units 112 may be facilitated by a booster pump (not shown) to further increase the speed of the introduction of the sand into desanding units 112.

In this embodiment, desanding units 112 include three 12 inch diameter hydroclones, such as the 3-12 D-SANDER commercially available from M-I Swaco, L.L.C., in Houston, Tex. Desanding units 112 provide a 40-60 micron cut, separating sand from the hydrocarbons present in the fluid. Desanding units 112 also provide additional shear, which assists in the separation of hydrocarbons from the sand. During processing, desanding units 112 separate the incoming sand/fluid mixture into two streams, a first stream or underflow that contains mostly the sand and may constitute 10-20 percent of the total flow, and a second stream or overflow that contains mostly liquids and hydrocarbons and may constitute 80-90 percent of the total flow. The underflow of desanding units 112 discharge into a first compartment 113 of an auger tank 114, while the overflow discharges into a second compartment 115 of auger tank 114. Those of ordinary skill in the art will appreciate that the operational parameters of desanding units 112 may be adjusted based on operational requirements and/or the size of the sand particles, flow rates of the sand/fluid mixture, etc. For example, in certain embodiments, the desanding unit 112 apex may be increased to, for example at least two inches, to minimize back-pressure on the process due to solids loading in the flow. In other embodiments when finer sands particles are present, the desanding units 112 may include six inch diameter hydroclones instead of twelve inch hydroclones.

In addition to first compartment 113 and second compartment 115, auger tank 114 includes two horizontal augers 116 (one shown) that extend the length of auger tank 114. Those of ordinary skill in the art will appreciate that alternative configures of augers may be used, such as one horizontal auger 116 or more than two horizontal augers 116. First compartment 113 is configured to allow the underflow from desanding units 112 to settle into the horizontal augers 116, which may then auger the sand through auger tank 114. Horizontal augers 116 include flights having one or more lifters on each flight. In certain embodiments, each flight includes at least four lifters. The lifters promote agitation of the sand as the sand is augered through auger tank 114. The agitation may further separate hydrocarbons from the sand, and as the hydrocarbons have a lower specific gravity than the sand, the hydrocarbons may float to the surface of auger tank 114.

The overflow from desanding units 112 discharges into second compartment 115 of auger tank 114. The overflow discharges through a flow distribution conduit 117 that is configured to disperse the overflow throughout the surface of auger tank 114, as well as create laminar flow. Second compartment 115 includes a plurality of inclined plates 118 (e.g. lamella plates) configured to settle fines in the overflow, thereby allowing the fines to settle into horizontal auger 116. In addition to inclined plates 118, second compartment 115 may include air sparing tubes 119, located behind/between inclined plates 118 and configured to promote the separation of suspended hydrocarbon droplets by introducing dissolved air bubbles that induce suspended hydrocarbons to coalesce and float to the surface.

Hydrocarbons that float to the surface of second compartment 115 overflow from auger tank 114 to separator 120. In this embodiment, separator 120 is a container that is separated into two compartments, an oil collection/skimming compartment 121 and a clean water compartment 122. The overflow from auger tank 114 enters separator 120 through an overflow trough (not shown) that promotes even laminar flow of the fluid entering separator 120. Oil collection/skimming compartment 121 includes a weir arrangement that promotes the separation of hydrocarbons, allowing the hydrocarbons to float to the surface, while clean water flows through an underflow and subsequent overflow into clean water compartment 122. Oil collection/skimming compartment 121 also includes a skimmer 123, such as a drum skimmer, configured to collect hydrocarbons from the surface of the fluids. The skimmed hydrocarbons are then transferred to a recovered hydrocarbon tank 124 via a pump 125, such as an air diaphragm pump.

Clean water from clean water compartment 122 may then be pumped via pump 126 to a centrifuge 127, or other separatory device. Prior to injection of the clean water into centrifuge 127, chemicals, such as flocculants may be added to the clean water. The flocculants may promote residual solid particles to form flocs that may subsequently be separated from the clean water through centrifugation. To inject the flocculant, a liquid flocculant stored in flocculant storage tank 128 may be injected into the clean water flow by a pump 129, such as an air diaphragm pump.

In certain embodiments, clean water from clean water compartment 122 may be pumped via pump 170 to second hopper 107. By transferring clean water from clean water compartment 122 to second hopper 107, a closed water circulation loop may be formed, thereby increasing the efficiency of water use in the system 100.

In one embodiment, centrifuge 127 may be a decanter centrifuge capable of processing 50-100 gpms to clarify the clean water. By removing solids and emulsified oil buildup within the water, the operating life of the system may be increased. After centrifugation, the water phase from the underflow of the centrifuge may be reused by the system. To reuse the water phase, the water may be pumped to a third hopper 130. In other embodiments, the water may be pumped to one or more heat exchangers 131, so that the water may be reheated prior to reuse. The overflow from the centrifuge, which may contain hydrocarbons and residual solids may then be transferred back to separator 120 for additional separation or if the solids are sufficiently void of hydrocarbons, the solids may be transferred to solids collection tank 150.

Referring back to the auger tank 114, the horizontal screw auger 116 transfers the fine solids to a second inclined auger 151. The final discharge point of second inclined auger 151 extends above the water line of the water in auger tank 114, thereby allowing residual water in second inclined auger 151 to flow back into auger tank 114 via conduit 132. To promote the return of water through conduit 132, the conduit is angled at a 4 degree downward slant, thereby allow the water to gravity feed back into auger tank 114. In this embodiment, the final discharge point of second inclined auger 151 extends above the waterline in auger tank 114 by at least three feet, however, in other embodiments, this distance may be increased or decreased as required to promote the discharge of residual water through conduit 132. Those of ordinary skill in the art will appreciate that in alternate embodiments conduit 132 may be angled at other degrees so as to promote the flow of residual water back into auger tank 114.

Sand from second inclined auger 151 is discharged into third hopper 130, which may be a high-speed, rapid-induction, dynamic eductor hopper. As with the second hopper 107, third hopper 130 includes a table 133 and an eductor 134. Third hopper 130, similar to second hopper 107, uses a motive flow through a confined space to create a vacuum. The vacuum may be used to pull sand into the motive flow, promoting the mixture of the sand with liquids and or a liquid chemical mixture, such as a surfactant mixture. Third hopper 130, after mixing the sand, liquid, and surfactant then discharges the mixture for transportation to a second desanding unit 135.

Second desanding units 135 provide a 40-60 micron cut, separating sand from the hydrocarbons present in the fluid. Second desanding units 135 also provide additional shear, which assists in the separation of hydrocarbons from the sand. During processing, second desanding units 135 separate the incoming sand/fluid mixture into two streams, a first stream or underflow that contains mostly the sand and may constitute 10-20 percent of the total flow, and a second stream or overflow that contains mostly liquids and hydrocarbons and may constitute 80-90 percent of the total flow. The underflow discharges into a first compartment 136 of a second auger tank 137, while the overflow discharges into a second compartment 138 of second auger tank 137. Those of ordinary skill in the art will appreciate that the operational parameters of desanding units 135 may be adjusted based on operational requirements and/or the size of the sand particles, flow rates of the sand/fluid mixture, etc.

In addition to first compartment 136 and second compartment 138, second auger tank 137 includes two horizontal augers 139 (one shown) that extend the length of second auger tank 137. As explained above, in alternate embodiments the number of horizontal augers 139 may vary depending on the requirements of the system 100. First compartment 136 is configured to allow the underflow from second desanding units 135 to settle into the horizontal augers 139, which may then auger the sand through second auger tank 137. Horizontal augers 137 may also include flights having one or more lifters on each flight. In certain embodiments, each flight includes at least four lifters. The lifters promote agitation of the sand as the sand is augered through auger tank 137. The agitation may further separate hydrocarbons from the sand, and as the hydrocarbons have a lower specific gravity than the sand, the hydrocarbons may float to the surface of auger tank 137.

The overflow from second desanding units 135 discharges into second compartment 138 of second auger tank 137. The overflow discharges through a flow distribution conduit 140 that is configured to disperse the overflow throughout the surface of second auger tank 137, as well as create laminar flow. Second compartment 137 includes a plurality of inclined plates 141 (e.g., lamella plates) configured to settle fines in the overflow, thereby allowing the fines to settle into horizontal auger 139. In addition to inclined plates 141, second compartment 138 may include air sparing tubes 142, located behind/between inclined plates 141 and configured to promote the separation of suspended hydrocarbon droplets by introducing dissolved air bubbles that induce suspended hydrocarbons to coalesce and float to the surface.

Second compartment 138 also includes a second skimmer 143. Second skimmer 143 is disposed at the discharge end of second compartment 138 and is configured to remove residual hydrocarbons that separate in second compartment 138. The second skimmer 143 then transfers the hydrocarbons to recovered hydrocarbon tank 124 via a pump 144. Downstream of second skimmer 143 in second compartment 138, a weir baffle 145 allows a second compartment overflow of surfactant water to be transferred to surfactant water overflow tank 146. The surfactant water may then be transferred back to third hopper 130 for reuse, transferred to heat exchanges 131, or otherwise be transferred to another portion of system 100.

Surfactant water overflow tank 146 may also receive overflows of water from separator 121 or second compartment 138 of second auger tank 137. In certain embodiments, prior to reuse, water from surfactant water overflow tank 146 may be transferred to a second centrifuge 147 via pump 148. Similar to centrifuge 127, prior to injection of water from surfactant water overflow tank 146 into centrifuge 147, a chemical flocculant may be injected into the water from a second flocculant storage tank 164 via a pump 149. In certain embodiments, the flocculant may alternatively be supplied from flocculant storage tank 128, thereby decreasing the number of storage tanks of system 100. An overflow of sand may then be removed by second centrifuge 147 and discharged into a solids collection tank 150, which may also hold solids discharged from the first centrifuge 127. An underflow from second centrifuge 147 is discharged back into second compartment 138 of second auger tank 137 so that additional hydrocarbons may be removed.

Referring back to the second compartment 138 of second auger tank 137, the horizontal augers 139 discharge sand into a third inclined auger 152, similar to second inclined auger 151. As with second inclined auger 151, the final discharge point of third inclined auger 152 extends above the water line of the water in second auger tank 137, thereby allowing residual water in third inclined auger 152 to flow back into auger tank 137 via conduit 153. To promote the return of water through conduit 153, the conduit is angled at, for example, a four degree downward slant, thereby allow the water to gravity feed back into auger tank 137. In this embodiment, the final discharge point of third inclined auger 152 extends above the waterline in auger tank 137 by at least three feet, however, in other embodiments, this distance may be increased or decreased as required to promote the discharge of residual water through conduit 153.

The final discharge point of third inclined auger 152 discharges cleaned sand into a cleaned sand storage tank 154. The cleaned sand may subsequently be reintroduced into the natural environment or otherwise used as uncontaminated sand may be used.

In addition to the above components, chemicals used in the operation, such as solvents and surfactants may be mixed and introduced into system 100 at various locations. Solvent storage tank 155 holds solvents, such as biodegradable diesel, which may be used to separate hydrocarbons from the sand. Solvents may be injected to the sand/fluid mixture at various locations, for example, through injection points 105, at eductor 109, or prior to water use/reuse through heat exchangers 131. Prior to injection, the solvent may be mixed in water, either fresh water or seawater, to a range of 1-10 percent by volume. After mixing the solvent with the water, the solvent may be injected into system 100, as discussed above.

Similarly, a surfactant storage tank 156 holds surfactants, such as ethoxylated alcohol, and mixed into system 100 at various locations. For example, surfactants may be injected through eductor 134 or prior to water use/reuse through heat exchangers 131. Prior to injection, surfactant may be mixed with water in a range of 100-500 parts per million, and then injected into the sand/fluid mixture.

In addition to the components discussed above, system 100 may include other various components to further enhance the operating efficiency or separation. While system 100 may lose some water due to evaporation, system 100 is substantially closed system, wherein cleaned water is reused in subsequent separation operations. While the water separated by centrifuges 127 and 147 may be reused, as well as water collected in surfactant water overflow tank 146, prior to reuse, the water may be transferred to heat exchangers 131, wherein additional water may be added to replace water lost to evaporation, etc. Such additional water may be supplied from one or more water tanks 157 and/or hot water storage tanks 158. In certain embodiments, it may also be advantageous to include a descaling solution to the water. The descaling solution may increase the pH of the stored water to prevent the formation of scale in the storage containers. As illustrated, a descaling unit may include a descaling solution tank 159, and a pump 160 for injecting descaling solution into water storage tanks 157 and/or hot water storage tanks 158.

System 100 may also include propane tanks 161, fuel tanks 162, and/or multiple generators 163 for powering the operation. Additionally, various components of system 100 may be controlled through the use of an adjustable speed drive, such as a variable frequency drive. For example, variable frequency drives may be used to control the operation speed of first, second, or third inclined augers 104, 151, and 152, as well as horizontal screw augers 116, 139.

During operation of the system, initially, a supply of contaminated sand may be delivered to the system. Large debris may then be removed from the contaminated sand, and the contaminated sand may be agitated in order to separate clumped or compacted sand that may inhibit flow through the system or otherwise render the separation of hydrocarbons less effective. Fluid, such as fresh or sea water may then be injected into the contaminated sand, thereby resulting in a sand/fluid mixture. In certain embodiments, prior to injection of the fluid, the fluid may be heated to about 110 degrees Fahrenheit, which facilitates the separation of hydrocarbons from the sand. During the injection of the fluid, a solvent may also be injected. The solvent may facilitate the separation of the hydrocarbons from the sand. Hydrocarbons and fluid may then be separated from the mixture through use of a desanding unit, as described above. The overflow from the desanding unit, which may include a majority of the hydrocarbons and fluid is then transferred to an auger tank, wherein the hydrocarbons are further separated from the fluid due to the difference in the specific gravity of the hydrocarbons and the fluid. To facilitate the separation of the hydrocarbons from the fluid, air may be injected into the auger tank. Additionally, as fine particles may be present in the overflow, a plurality of plates may be disposed in the auger tanks to direct the fines, as it settles out of the fluid, into a horizontal auger.

The underflow from the desanding units, which is mostly sand, but may also include fluid, is then discharged into the auger tank. The sand may then settle in the auger tank into the horizontal auger. The horizontal auger agitates the sand and fines due in part to the presence of flights having lifters disposed thereon continuously contacting and moving the sand. The agitation may cause further separation of residual hydrocarbons from the sand and fines. The horizontal auger may then transfer the sand and fines to an inclined auger that removes fluids from the sand and fines and eventually discharges the sand and fines into a hopper.

The separated hydrocarbons in the auger tank may overflow from the auger tank into a separator, wherein a skimmer may be used to remove additional hydrocarbons. The fluid, including residual hydrocarbons, may then flow through a weir arrangement, promoting further separation of hydrocarbons from the fluid, such that the hydrocarbons float on the surface of the separator while the fluids are transferred into a clean tank. Fluids in the clean tank, substantially free from hydrocarbons, may then be transferred to a centrifuge, where residual fines and hydrocarbons may be separated from the fluid, so that the fluid may be reused in subsequent operations. Prior to centrifugation, a flocculant may be added to the fluid to further enhance the separation of fines from the fluid.

Referring back to the sand and fines that were in the hopper, additional fluid may be added to the sand to create a second sand/fluid mixture. As the fluid is added to the mixtures, a surfactant may also be added to the mixture to enhance the separation of hydrocarbons from the surface of the sand. The second sand/fluid mixture may then be transferred to a desanding unit, wherein hydrocarbons and fluid are separated from the mixture as an overflow, and the overflow is transferred to a second auger tank. The underflow from the desanding unit, which includes primarily sand, is also transferred to the second auger tank. The sand is allowed to settle into a second horizontal auger in the second auger tank, while the hydrocarbon floats to the surface. To promote the separation of hydrocarbons from the fluid, air may be injected into the second auger tank, as may occur with first auger tank, described above.

Hydrocarbons that have separated to the surface of the fluid in the second auger tank may then be removed from the second auger tank through use of a skimmer. While the hydrocarbons are removed from the auger tanks, fines and sand that have settled into the second horizontal auger may be transferred to a second inclined auger. To further enhance the separation of hydrocarbons from the sand and fines, the second horizontal auger may include a plurality of flights each having a plurality of lifters to agitate the sand. The agitation may increase the separation so that the sand and fines transferred to the second inclined auger are substantially hydrocarbon free. The sand and fines transferred to the second inclined auger may then be separated from residual fluid, due to the inclination of the auger and discharged into a clean sand storage bin.

Remaining fluid from the separator and/or second auger tank may be transferred to a surfactant water overflow tank, wherein the fluids may be reused or the fluids may be reconditioned for eventual reuse. Reconditioning may include passing the fluids through one or more heat exchanges and reheating the fluids to about 110 degrees Fahrenheit. By maintaining the temperature at about 110 degrees Fahrenheit, separation of the hydrocarbons from the sand may be enhanced.

Advantageously, embodiments, of the present disclosure may allow for the separation of hydrocarbons from sand. The separation of the hydrocarbons from sand may thereby allow sand that is contaminated due to oil leaks and spills to be remediated and reintroduced into the natural environment. Also advantageously, because the chemicals used in the processing may be biodegradable and/or non-toxic to the environment, the contaminated sand may be reintroduced into the environment without expensive methods of removing residual chemicals from the sand after the hydrocarbons have been removed. Also advantageously, embodiments of the present invention may provide a modular system that may be constructed quickly or transported as a unit, thereby allowing the system to be setup quickly in response to an emergency situation, such as an oil spill.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A system for removing hydrocarbons from sand, the system comprising:
    a first hopper configured to screen large debris from a contaminated sand source;
    a first inclined auger in fluid communication with the first hopper;
    a second hopper in fluid communication with the first inclined auger, the second hopper comprising a eductor;
    a first desanding unit in fluid communication with the second hopper;
    a first auger tank having a first compartment and a second compartment and a horizontal auger, wherein the first compartment is configured to receive an under flow from the first desanding unit and the second compartment is configured to receive an overflow from the first desanding unit;
    a second inclined auger in fluid communication with the horizontal auger; and
    a separator in fluid communication with the first auger tank and configured to receive a hydrocarbon overflow from the first auger tank.

2. The system of claim 1, further comprising a third hopper in fluid communication with the second inclined auger, wherein the third hopper comprises a second eductor.

3. The system of claim 2, further comprising a second desanding unit in fluid communication with the third hopper.

4. The system of claim 3, further comprising a second auger tank, the second auger tank comprising a first compartment, a second compartment, and a second horizontal auger, wherein the first compartment is configured to receive an under flow from the second desanding unit and the second compartment is configured to receive an overflow from the second desanding unit.

5. The system of claim 4, further comprising a third inclined auger in fluid communication with the second horizontal auger.

6. The system of claim 5, wherein at least one of the first and second auger tanks comprises a skimmer.

7. The system of claim 6, wherein at least one of the first and second auger tanks comprises at least one air sparing tubes configured to supply a flow of air to at least one of the first and second auger tanks.

8. The system of claim 7, wherein at least one of the first and second auger tanks comprises a plurality of inclined plates.

9. The system of claim 8, further comprising a surfactant water overflow tank in fluid communication with at least one of the third inclined auger, the separator, and the second auger tank.

10. The system of claim 9, further comprising at least one centrifuge in fluid communication with at least one of the separator and the surfactant water overflow tank.

11. The system of claim 10, further comprising a solvent storage tank and a flocculant supply tank, wherein the solvent storage tank and flocculant supply tank are configured to supply a solvent and a flocculant to the system.

12. The system of claim 11, further comprising at least one heat exchanger.

13. The system of claim 12, further comprising a flocculant storage tank in fluid communication with the at least one centrifuge, wherein the flocculant storage tank is configured to supply a flocculant to the system.

14. The system of claim 13, wherein at least one of the first and second horizontal auger comprises a plurality of flights having a plurality of lifters.

15. A method of removing hydrocarbons from sand, the method comprising:
    supplying contaminated sand;
    removing large debris from the contaminated sand;
    injecting a fluid into the contaminated sand to create a sand/fluid mixture;
    separating hydrocarbons and the fluid from the mixture, wherein the hydrocarbons and fluid are transferred to an auger tank as an overflow and the sand is transferred to the auger tank as an underflow;

settling the sand in the auger tank into a horizontal auger;

transferring the sand to an inclined auger;

separating hydrocarbons from the fluid in the auger tank;

transferring the hydrocarbons from the auger tank to a separator.

16. The method of claim 15, further comprising:

transferring the sand from the inclined auger to a hopper, wherein the hopper is configured to inject fluid into the sand to create a second sand/fluid mixture;

separating hydrocarbons and fluid from the second sand/fluid mixture, wherein the hydrocarbons and fluid are transferred to a second auger tank as an overflow and the sand is transferred to the second auger tank as an underflow;

settling the sand in the second auger tank;

separating hydrocarbons from the fluid in the second auger tank;

removing the hydrocarbons from the second auger tank; and transferring the sand in the second auger tank to a second inclined auger.

17. The method of claim 16, further comprising:

injecting a solvent into the second sand/fluid mixture; and injecting a surfactant into the second sand/fluid mixture.

18. The method of claim 17, further comprising:

heating the sand/fluid mixture to about 110° F.

19. The method of claim 18, further:

comprising injecting air into at least one of the first and second auger tanks.

\* \* \* \* \*